(12) United States Patent
Guillez et al.

(10) Patent No.: US 7,273,244 B2
(45) Date of Patent: Sep. 25, 2007

(54) PROTECTIVE DEVICE FOR OBJECTS PLACED INSIDE THE REAR BOOT OF A MOTOR VEHICLE

(75) Inventors: Jean-Marc Guillez, Cirieres (FR); Paul Queveau, Montravers (FR); Gérard Queveau, Le Pin (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 181 days.

(21) Appl. No.: 10/521,834

(22) PCT Filed: Jun. 26, 2003

(86) PCT No.: PCT/FR03/01980

§ 371 (c)(1),
(2), (4) Date: Sep. 23, 2005

(87) PCT Pub. No.: WO2004/009386

PCT Pub. Date: Jan. 29, 2004

(65) Prior Publication Data

US 2006/0145500 A1 Jul. 6, 2006

(30) Foreign Application Priority Data

Jul. 19, 2002 (FR) .................................. 02 09220

(51) Int. Cl.
*B60J 7/00* (2006.01)

(52) U.S. Cl. ................................. 296/107.08; 296/37.1
(58) Field of Classification Search ........... 296/107.08, 296/37.1
See application file for complete search history.

(56) References Cited

U.S. PATENT DOCUMENTS

| 6,062,628 | A  | * | 5/2000 | Guillez ................... 296/107.08 |
| 6,092,335 | A  | * | 7/2000 | Queveau et al. ....... 296/107.08 |
| 6,193,300 | B1 | * | 2/2001 | Nakatomi et al. ..... 296/107.08 |
| 6,325,445 | B1 | * | 12/2001 | Schenk ................... 296/107.08 |
| 2002/0105205 | A1 | * | 8/2002 | Willard ................. 296/107.07 |

* cited by examiner

Primary Examiner—Lori L. Lyjak
(74) Attorney, Agent, or Firm—Daphne L. Burton

(57) ABSTRACT

The invention relates to a protective device (8) comprising a panel (9) forming the vertical limit between a protected zone (10) of the rear boot (2) used to receive the objects (7) and accessible when the rear boot (2) is open from the rear forward, and a second zone (11) of the rear boot (2) used to receive the roof (1) in a folded, stored position and located above the protected zone (10), the panel (9) being moveable between a low protecting position and a high protecting position. The invention is characterised in that the panel (9) co-operates with a first sensor (14) to prevent the roof (1) from being folded when the panel (9) is above the low protecting position, and with a second sensor (15) to prevent the boot (2) from being closed when the panel (9) is above the high protecting position.

10 Claims, 4 Drawing Sheets

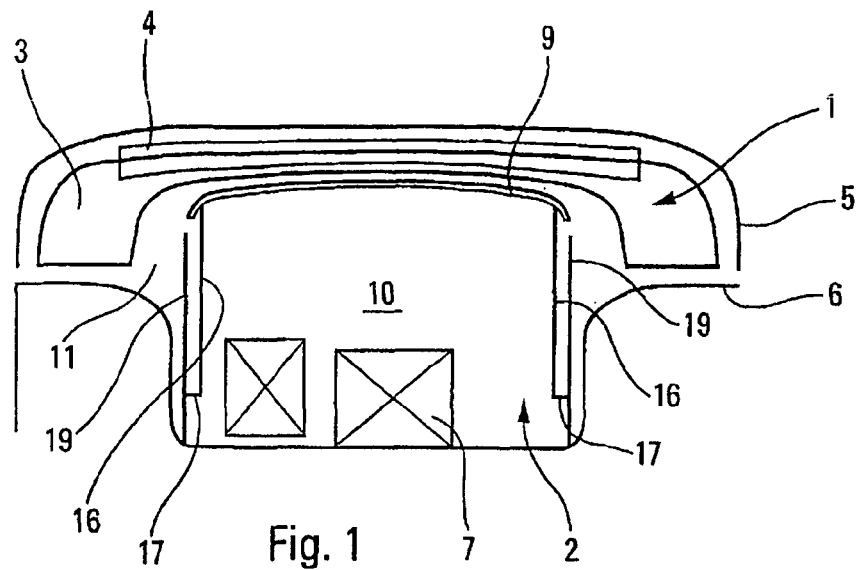
Fig. 1
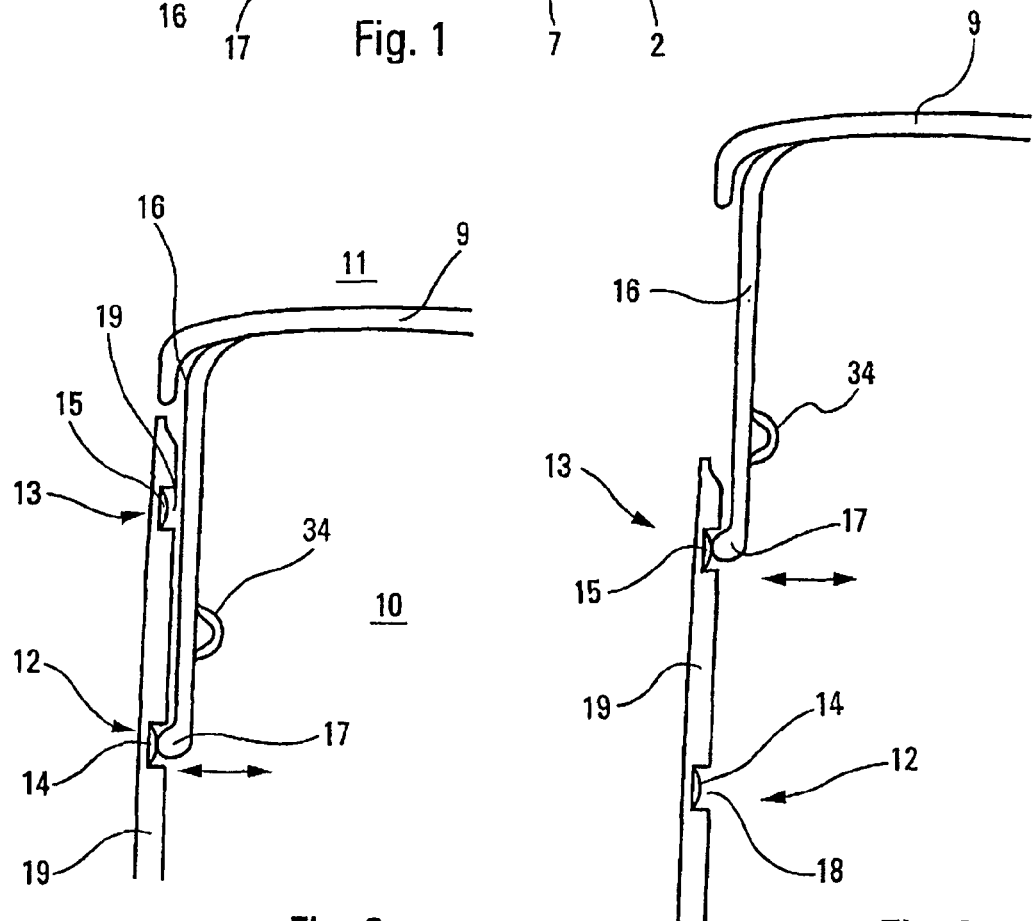
Fig. 2
Fig. 3

PROTECTIVE DEVICE FOR OBJECTS PLACED INSIDE THE REAR BOOT OF A MOTOR VEHICLE

CROSS-REFERENCE TO RELATED APPLICATIONS

This application claims priority to French patent application No. 0209220 filed on or about Jul. 19, 2002. A related application was also filed under the Patent Cooperation Treaty on or about Jun. 26, 2003, as PCT/FR03/01980. The PCT application claims priority to the French patent application.

BACKGROUND OF THE INVENTION

1. Field of the Invention

The invention relates to a protective device for objects placed inside the rear boot of a motor vehicle bearing a roof that folds away into the boot.

2. Description of the Related Art

We know of a device for protecting objects placed inside the rear boot of a motor vehicle bearing a foldaway roof movable between a deployed position in which it covers the passenger compartment of the vehicle, and a folded, stored position in which it is stored and retracted in the boot closed with a hood. Such a device is the type comprising a panel forming the vertical limit between a protected zone of the boot used to receive the objects and accessible when the boot is open from the rear forward, and a second zone of the boot used to receive the roof in the folded, stored position and located above the protected zone, the panel being moveable between at least a low protecting position in which the protected zone fills a first volume which is free when the boot is closed and the roof is in its folded, stored position, and a high protecting position in which the protected zone fills a second volume which is free when the boot is closed and the roof is in its deployed position, first and second means for securing being used to lock the panel respectively in its low protecting position and in its high protecting position, the panel in the low protecting position being used to co-operate with a first sensor so as to authorise the folding of the roof.

Such a device is described, for example, in the French patent application 2 796 901. In this prior application, the rear boot is closed, on one hand, by a hood opening from the front backward in order to allow the roof to pass whilst moving between its folded, stored position to its deployed position and, on the other hand, by a rear door opening from the rear forward in order to allow objects to be placed inside. In this prior application, the movement of the roof and that of the hood are controlled by actuators only when the panel is in its low protecting position, which ensures the protection of the objects. The movement of the rear door is manually controlled, the user ensuring the protection of the objects.

However, there are vehicles for which the opening and closing of the rear boot is entirely automated: either, as in the aforementioned application, the boot comprises a hood and a rear door whose respective movements are controlled by actuators, or, the boot comprises a hood controlled by an actuator and articulated so as to be opened from the front backward or from the rear forward.

For this reason, the devices for protecting objects of the prior art do not allow the objects to be protected during the automatic closing of the boot.

SUMMARY OF THE INVENTION

The purpose of the invention is to resolve the aforementioned inconvenience, and to propose a device for protecting objects which is simple, reliable, cost effective, easy to use and capable of ensuring good protection of luggage placed inside the rear boot of the vehicle irrespective of the closing movement of the closing element of the boot.

According to the invention, the co-operation of the panel with the first sensor is such that, when the panel is higher than the low protecting position, the roof can not be folded, and the co-operation of the panel with a second sensor is such that, when the panel is higher than the high protecting position, the boot can not be closed.

The co-operation of the panel with either of the two sensors depending on its position allows to efficiently and simply protect any object from damage that could be caused through the folding of the roof or the closing of the boot.

BRIEF DESCRIPTION OF THE DRAWINGS

Other features and advantages of the invention will become clear in the following detailed description, in relation to the annexed drawings, given by way of non-restrictive examples:

FIG. 1 represents a diagrammatic cross sectional view of the rear boot of a motor vehicle fitted with a device for protecting objects;

FIG. 2 is a diagrammatic partial view of a device for protecting objects according to the invention, the panel being in the low protecting position;

FIG. 3 is a view similar to that in FIG. 2, the panel being in the high protecting position;

DETAILED DESCRIPTION OF THE INVENTION

Figure 4:
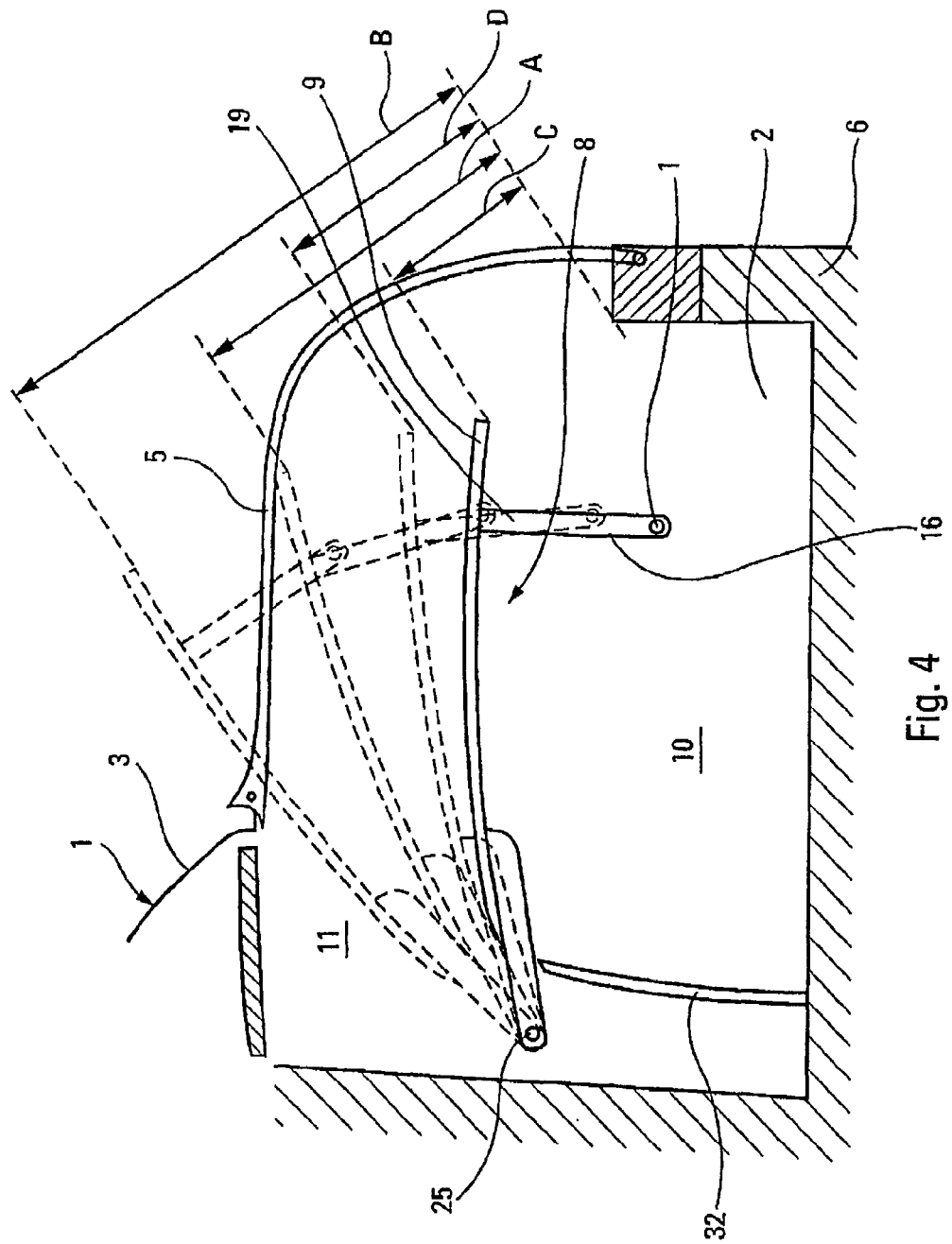
FIG. 4 is a longitudinal sectional view of the rear boot of a motor vehicle fitted with a device according to the invention.

A motor vehicle comprises a foldaway roof 1 which moves between a deployed position in which it covers the passenger compartment of the vehicle, and a folded, stored position in which it is stored and retracted into the rear boot 2 of the vehicle.

In the example illustrated in FIGS. 1 to 6, the roof 1 comprises at least two roof elements, a front roof element 3 and a rear roof element 4, used to be folded substantially horizontally into the upper part of the boot 2.

The rear boot 2 is fitted with a hood 5 which is articulated to the body 6 in order to open, on one hand, from the rear forward so that objects 7 can be placed inside the boot 2 and, on the other hand, from the front backward so that the foldaway roof 1 can pass.

The vehicle is fitted with a device 8 for protecting objects 7 placed inside the boot 2. The protective device 8 comprises a panel 9 which forms the vertical limit between a protected zone 10 of the boot 2 and a second zone 11 of the boot 2 located above the protected zone 10.

The protected zone 10 is used to receive the objects 7 and is accessible when the hood 5 of the boot 2 is open from the rear forward. The second protective zone 11 is used to receive the roof 1 in the folded, stored position.

The panel 9 is rigid and it can be moved between at least a low protecting position and a high protecting position.

When the panel 9 is in its low protecting position, the protected zone 10 fills a first volume which is free when the hood 5 closes the boot 2, the roof 1 then being in its folded, stored position.

When the panel 9 is in its high protecting position, the protected zone 10 fills a second volume which is free when the hood 5 closes the boot 2, the roof 1 then being in its deployed position.

First securing means 12 are used to lock the panel 9 in its low protecting position, and second securing means 13 are used to lock the panel 9 in its high protecting position.

Furthermore, the panel 9, in the low protecting position, is used to co-operate with a first sensor 14 so as to authorise the folding of the roof 1 and the locking of the hood 5.

According to the invention, the co-operation of the panel 9 with the first sensor 14 is such that, when the panel 9 is higher than the low protecting position, the roof 1 can not be folded, and the co-operation of the panel with a second sensor 15 is such that, when the panel 9 is higher than the high protecting position, the boot 2 can not be closed, actuators being used to control the automatic opening and closing of the boot 2 and the folding and deploying of the roof 1. Of course, both of the sensors 14 and 15 are connected to the electric circuit to which the means for controlling the movement of the roof 1 and the hood 5 are connected.

Thus, according to the invention, the objects 7 placed inside the protected zone 10 can not be damaged by either the roof 1 nor the hood 5 and, hence, the roof 1 can not be damaged by the objects 7.

Indeed, neither the roof 1, in the folded, stored position, nor the hood 5, in the closed position, can come into contact with the panel 9, in the low protecting position, because of the geographic position of the panel 9.

Furthermore, the hood 5, in the closed position, can not come into contact with the panel 9, in the high protecting position, because of the geographic position of the panel 9.

If the panel 9 is higher than its high protecting position then the hood 5 can not be closed. Likewise, if the panel 9 is higher than its low protecting position then the roof 1 can not be folded.

Thus, irrespective of its position, the panel 9 is protected from being damaged by any movement of the roof 1 or the hood 5. Of course, this also stands for the objects 7 which are in the protected zone 10 for which it forms the upper vertical limit. Hence, the roof 1 is protected from any contact with the objects 7 that could damage it.

As can be seen in FIGS. 2 to 5, an arm 16 is attached to each lateral side of the panel 9 in a movable manner in the transversal direction to the vehicle.

Each of the two arms 16 comprises a stub 17 which projects transversally towards the outside of the protected zone 10. Each stub 17 is used to penetrate into a first opening 18 which is made in an anchorage element 19 integral with the body 6 and which defines the low protecting position, so as to lock the panel 9 in this position.

In the example illustrated in FIGS. 2 to 5, each arm 16 extends towards the bottom of the boot 2 and is attached by its upper end, in a flexible manner, to the panel 9, each arm 16 being constantly solicited in the direction of the corresponding anchorage element 19. Each stub 17 is at the lower end of the corresponding arm 16. The flexibility of the arm 16 attachment to the panel 9 is sufficient to provide the corresponding stub 17 with a sufficient range of movement so that it can engage into and disengage out of the first opening 18 of the corresponding anchorage element 19. Each arm 16 comprises a handle 34 acting as a gripping means enabling the user to bend the arm 16.

As can be seen in FIG. 3, the first sensor 14 is housed in the first opening 18. It is made to be actuated by the stub 17 when the latter is in the first opening 18 (see FIG. 2).

As can be seen in FIGS. 2 to 5, each anchorage element 19 comprises a second opening 20 which defines the high protecting position, and in which the corresponding stub 17 is used to penetrate in order to lock the panel 9 in this position. The second sensor 15 is housed in the second opening 20 and it is made to be actuated by the stub 17 when the latter is in the second opening 20 (see FIG. 3).

Furthermore, when the hood 5 of the boot 2 is open from the rear forward, the roof 1 being in its deployed position, the panel 9 can be placed in a high introductory position above the high protecting position so as to facilitate the placing of objects 7 in the protected zone 10.

Thus, as can be seen in FIG. 4, the distance between the rear edge of the panel 9 and the rear edge of the boot 2 has increased (see the distance A when the panel 9 is in its high protecting position and the distance B when it is in its high introductory position).

Figure 5:
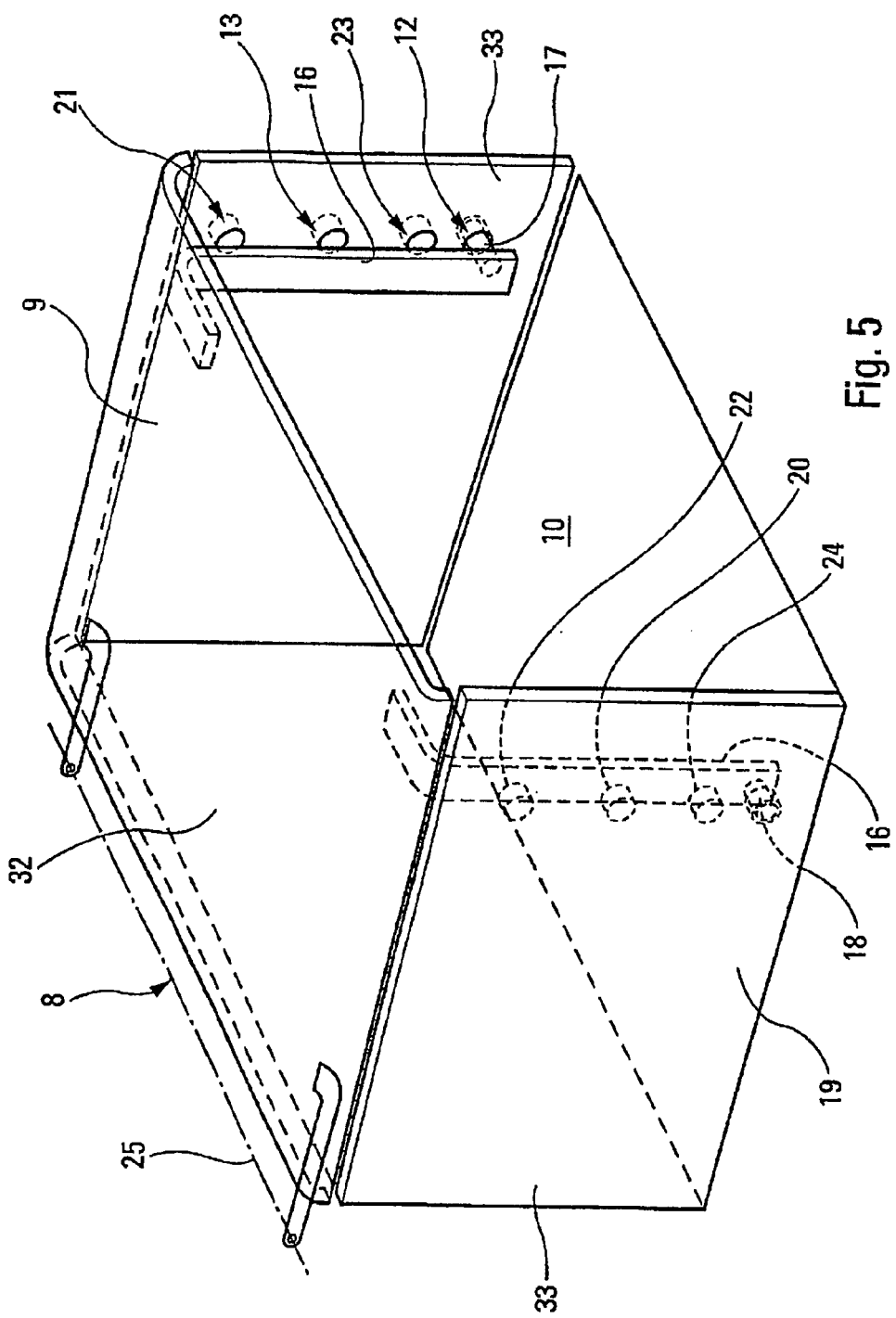
FIG. 5 is a perspective view of a device according to the invention.

Advantageously, third securing means 21 are used to lock the panel 9 in its high introductory position. As can be seen in FIG. 5, each anchorage element 19 comprises a third opening 22 which defines the high introductory position and in which the corresponding stub 17 is used to penetrate in order to lock the panel 9 in this position.

Of course, as long as the panel 9 has not lowered to its high protecting position, the hood 5 can not be closed. Moreover, as long as it has not lowered to its low protecting position, the roof 1 can not be folded.

In the example illustrated in FIG. 4, the vehicle is fitted with a device used to facilitate the placing of objects 7 under the roof 1 (device not illustrated). This device is used to guide the roof 1 from its folded, stored position to a folded, raised position in which the boot 2 is open from the rear forward, the roof 1 being at least partially projecting out of the boot 2. Thus, when the hood 5 of the boot 2 is open from the rear forward, the roof 1 then being in its folded, raised position, the panel 9 can be moved into a low introductory position above the low protecting position so as to facilitate the placing of objects 7 in the protected zone 10.

Thus, as can be seen in FIG. 4, the distance between the rear edge of the panel 9 and the rear edge of the boot 2 has increased (see the distance C when the panel 9 is in its low protecting position and the distance D when it is in its low introductory position).

Advantageously, fourth securing means 23 are used to lock the panel 9 in its low introductory position. As can be seen in FIG. 5, each anchorage element 19 comprises a fourth opening 24 in which the corresponding stub 17 is used to penetrate in order to lock the panel 9 in its low introductory position.

Of course, as long as the panel 9 has not reached its low protecting position, the roof 1 can not be lowered and the hood 5 can not be closed.

In this specific example, the structure of the securing means 12, 13, 21 and 23 is such that the panel 9 can only have four stable positions.

In the example illustrated in FIGS. 4 and 5, the panel 9 is rotary mounted in relation to the body 6: it is supported, at its front end, by an axis of rotation 25 and oriented in the transversal direction of the vehicle, and around which it swivels.

Figure 6:
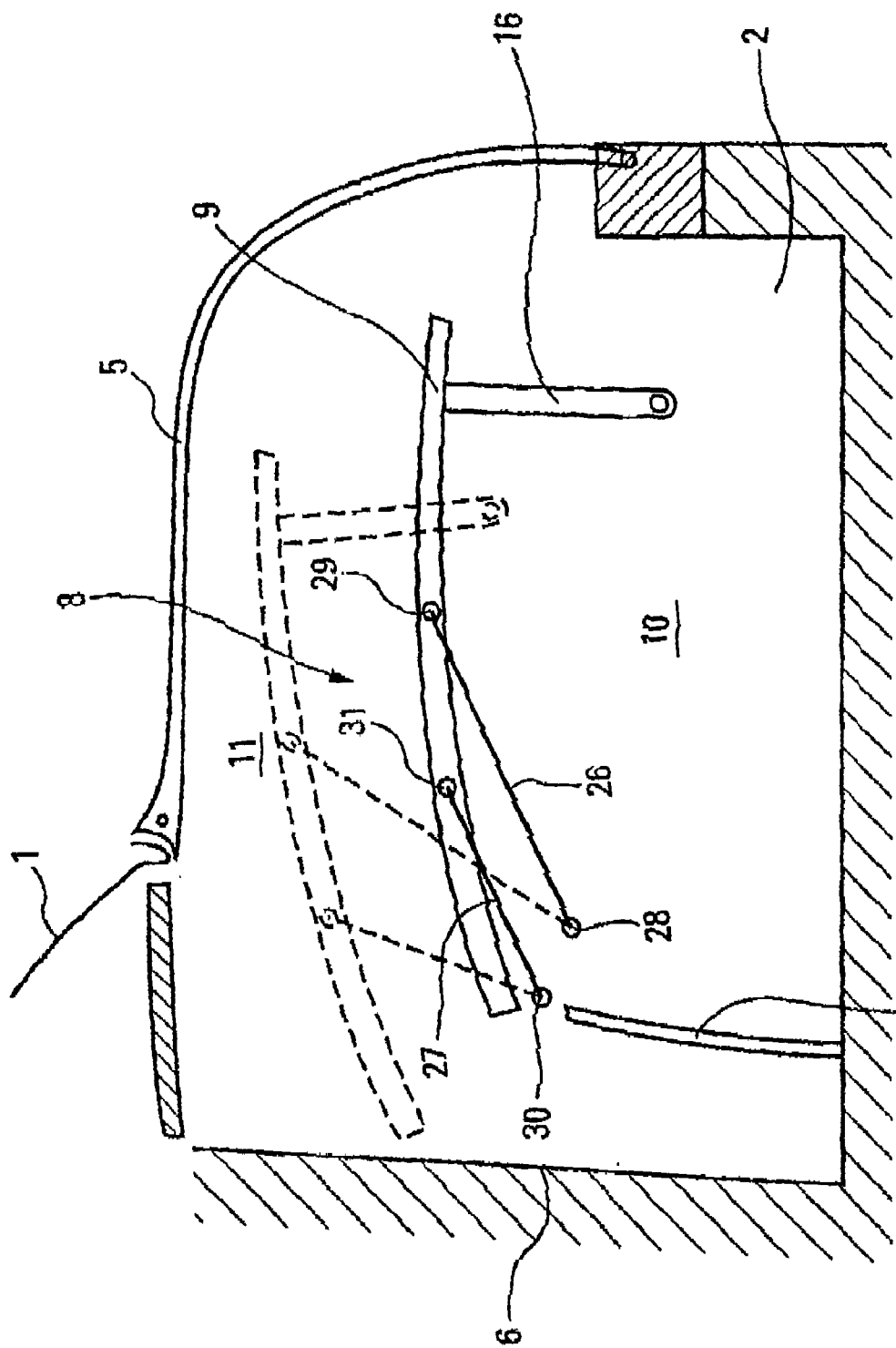
FIG. 6 is a view similar to that in FIG. 4 of a device according to another embodiment.

In the example illustrated in FIG. 6, the panel is mounted in a moveable connective manner in relation to the body via two pairs of swivel arms 26 and 27. The first pair of swivel arms 26 is rotary mounted, at a first end, in relation to the body 6, around a first swivel axis 28 and, at a second end, in relation to the panel 9, around a second swivel axis 29. Likewise, the second pair of swivel arms 27 is rotary mounted, at a first end, in relation to the body 6, around a third swivel axis 30 and, at a second end, in relation to the panel 9, around a fourth swivel axis 31. The panel 9 is guided by the rotation of the two pairs of swivel arms 26 and 27 which are arranged so as to form a parallelogram, each of the four swivel axes 28, 29, 30 and 31 being oriented in the transversal direction of the vehicle. Of course, not represented in FIG. 6, the panel 9 can be in the low and high protecting positions and the low and high introductory positions.

Moreover, in order to improve the protection of the objects 7, as can be seen in FIG. 5, preferably the protective device 8 comprises a back wall 32 which substantially extends vertically and limits the protection zone 10 in the direction of the front of the vehicle, and two side walls 33 which substantially extend vertically and limit the protective zone 10 in the transversal direction of the vehicle. In this example, the side panels constitute the means for anchoring 19.

Of course, the invention is not restricted to the embodiment described above, in detail.

Other means for rendering the stub 7 moveable can be used to articulate the panel 9 in relation to the body 6, in order to lock the panel 9 in one of its positions. It is also possible that means for articulating the panel 9 comprise means rendering the panel 9 stable irrespective of its position, the first and second sensors thus being located along the trajectory of the panel, respectively under the highest low protecting position, and between the highest low protecting position and the highest high protecting position.

Means for anchoring 19, independent of the side panels 33, can also be used.

There is claimed:

1. Device for protecting objects placed inside the rear boot of a motor vehicle bearing a foldaway roof movable between a deployed position in which it covers the passenger compartment of the vehicle, and a folded, stored position in which it is stored and retracted in the boot closed with a hood, the device comprising a panel forming the vertical limit between a protected zone of the boot used to receive the objects and accessible when the boot is open from the rear forward, and a second zone of the boot used to receive the roof in the folded, stored position and located above the protected zone, the panel being moveable between at least a low protecting position in which the protected zone fills a first volume which is free when the boot is closed and the roof is in its folded, stored position, and a high protecting position in which the protected zone fills a second volume which is free when the boot is closed and the roof is in its deployed position, first and second securing means being used to respectively lock the panel in its low protecting position and in its high protecting position, the panel in the low protecting position being used to co-operate with a first sensor so as to authorise the folding of the roof, wherein the co-operation of the panel with the first sensor is such that, when the panel is higher than the low protecting position, the roof can not be folded, and in that the co-operation of the panel with a second sensor is such that, when the panel is higher than the high protecting position, the boot can not be closed.

2. Device set forth in claim 1, wherein an arm is attached to each lateral side of the panel in a movable manner in the transversal direction to the vehicle, each arm comprising a stub projecting transversally towards the outside of the protected zone, an anchorage element integral with the body comprises a first opening in which the first sensor is housed, the stub being used to penetrate into the first opening in order to lock the panel in its low protecting position and to actuate the first sensor.

3. Device set forth in claim 2, wherein each stub at the lower end of the corresponding arm, which extends towards the bottom of the boot and which is attached in a flexible manner to the panel, is constantly solicited in the direction of the corresponding anchorage element.

4. Device set forth in claim 2, wherein each anchorage element comprises a second opening in which the second sensor is housed, the stub being used to penetrate into the second opening in order to lock the panel in its high protecting position and to actuate the second sensor.

5. Protective device set forth in claim 2, wherein, when the roof is in its deployed position and the boot is open from the rear forward, the panel can be placed in a high introductory position above the high protecting position so as to facilitate the placing of luggage in the protected zone.

6. Protective device set forth in claim 5, wherein third securing means are used to lock the panel in its high introductory position.

7. Device set forth in claim 6, wherein the anchorage element comprises a third opening in which the stub is used to penetrate in order to lock the panel in its high introductory position.

8. Protective device set forth in claim 2, the vehicle being fitted with a device used to facilitate the placing of objects under the roof by guiding it from its folded, stored position to a folded, raised position in which the boot is open from the rear forward and the roof at least partially projecting out of the boot, wherein, when the roof is in its folded, raised position and the boot is open from the rear forward, the panel can be moved into a low introductory position beyond the low protecting position so as to facilitate the placing of luggage in the protected zone, the co-operation of the panel with the first sensor being such that, when the panel is higher than the low protecting position, the roof can not be lowered and the boot can not be closed.

9. Device set forth in claim 8, wherein fourth securing means are used to lock the panel in its low introductory position.

10. Device set forth in claim 9, wherein the anchorage element comprises a fourth opening in which the stub is used to penetrate in order to lock the panel in its low introductory position.

* * * * *